United States Patent [19]

Takahashi

[11] Patent Number: 4,599,696
[45] Date of Patent: Jul. 8, 1986

[54] SYSTEM FOR DIAGNOSING AN INTERNAL COMBUSTION ENGINE

[75] Inventor: Toshio Takahashi, Mitakashi, Japan

[73] Assignee: Fuji Jukogyo Kabushiki Kaisha, Tokyo, Japan

[21] Appl. No.: 535,512

[22] Filed: Sep. 26, 1983

[30] Foreign Application Priority Data

Sep. 30, 1982 [JP] Japan .................... 57-171505

[51] Int. Cl.⁴ .......................... F02D 5/00; G06F 11/30
[52] U.S. Cl. ............................. 364/431.11; 123/479; 123/494
[58] Field of Search ............... 364/431.01, 431.11; 123/479, 494, 491; 340/52 F, 52 R, 57

[56] References Cited

U.S. PATENT DOCUMENTS

| | | |
|---|---|---|
| 3,938,075 | 2/1976 | Reddy . |
| 4,155,332 | 5/1979 | Yaegashi et al. ............ 123/494 |
| 4,219,798 | 8/1980 | Frister . |
| 4,244,340 | 1/1981 | Herth et al. . |
| 4,246,566 | 1/1981 | Endo et al. . |
| 4,414,949 | 11/1983 | Honig et al. ............ 123/479 |
| 4,491,112 | 1/1985 | Kanegae et al. ............ 123/479 |

FOREIGN PATENT DOCUMENTS

| | | | |
|---|---|---|---|
| 0032919 | 3/1980 | Japan ................. | 123/479 |
| 0148925 | 11/1980 | Japan ................. | 123/479 |
| 0062944 | 4/1982 | Japan ................. | 123/479 |
| 2090978 | 7/1982 | United Kingdom .... | 123/479 |

Primary Examiner—Parshotam S. Lall
Attorney, Agent, or Firm—Martin A. Farber

[57] ABSTRACT

A system for diagnosing an internal combustion engine having an air-flow meter. The air-flow meter comprises a voltage divider including a variable resistor. A wiper of the variable resistor is operatively connected to a flap in an intake passage so as to produce an output voltage, responsive to the volume of the intake air, a computor is provided for computing the volume of the intake air from the output voltage and a fixed voltage at one end of the variable resistor, a smoothing capacitor is provided for charging the fixed voltage and a diagnosing circuit is provided to respond to the fixed voltage for producing a diagnosis signal when the fixed voltage exceeds a predetermined range.

10 Claims, 5 Drawing Figures a diagnosis system
for internal combustion engines, and more particularly
to a system for diagnosing failure of an air-flow meter
system which operates to measure the volume of intake
air of an engine mounted on a motor vehicle.

A fuel-injection system of the type which is provided
with a computer operable to compute the volume of
intake air-flow from an output signal from the air-flow
meter in order to produce output signals for driving
solenoid-operated injection valves is known. If a fault
occurs, such as a disconnection of wires for the air-flow
meter or disengagement of a connector of the air-flow
meter from a terminal of a unit, control of the air-fuel
ratio of injected fuel can not be done. Accordingly,
such a fault is immediately detected to operate a fail-safe
system so as to prevent stalling of the engine. A conventional detecting means comprises a potentiometer operated by a flap in an intake passage and a smoothing
capacitor. When the voltage at the capacitor decreases
to a low level by the fault, the fail-safe system operates.
Since the voltage at the capacitor fluctuates during the
normal operation of the engine, the voltage, at which
the fail-safe system becomes operative, is set to a considerably low level in order to prevent misjudging of the
detection.

Therefore, a relatively long time elapses before the
voltage decreases to the preset low level at the fault, so
that the engine stalls.

SUMMARY OF THE INVENTION

It is an object of the preset invention to provide a
system for diagnosing fault in an air-flow meter system
which may quickly detect the fault of the air-flow meter
system so as to prevent stalling of an engine caused by
the fault.

According to the present invention, there is provided
a system for diagnosing an internal combustion engine
having an air-flow meter, said air-flow meter comprising variable resistor responsive to the volume of the
intake air for producing an output voltage; a computer
for computing the volume of the intake air from the
output voltage and a fixed voltage at one end of the
variable resistor; a first smoothing capacitor for charging the output voltage; a second smoothing capacitor
for charging the fixed voltage; and a diagnosing circuit
responsive to the fixed voltage for producing a diagnosis signal when the fixed voltage exceeds a predetermined range.

The present invention will be more apparent from the
following description made with reference to the accompanying drawings.

DETAILED DESCRIPTION OF THE PREFERRED EMBODIMENT

Figure 1:
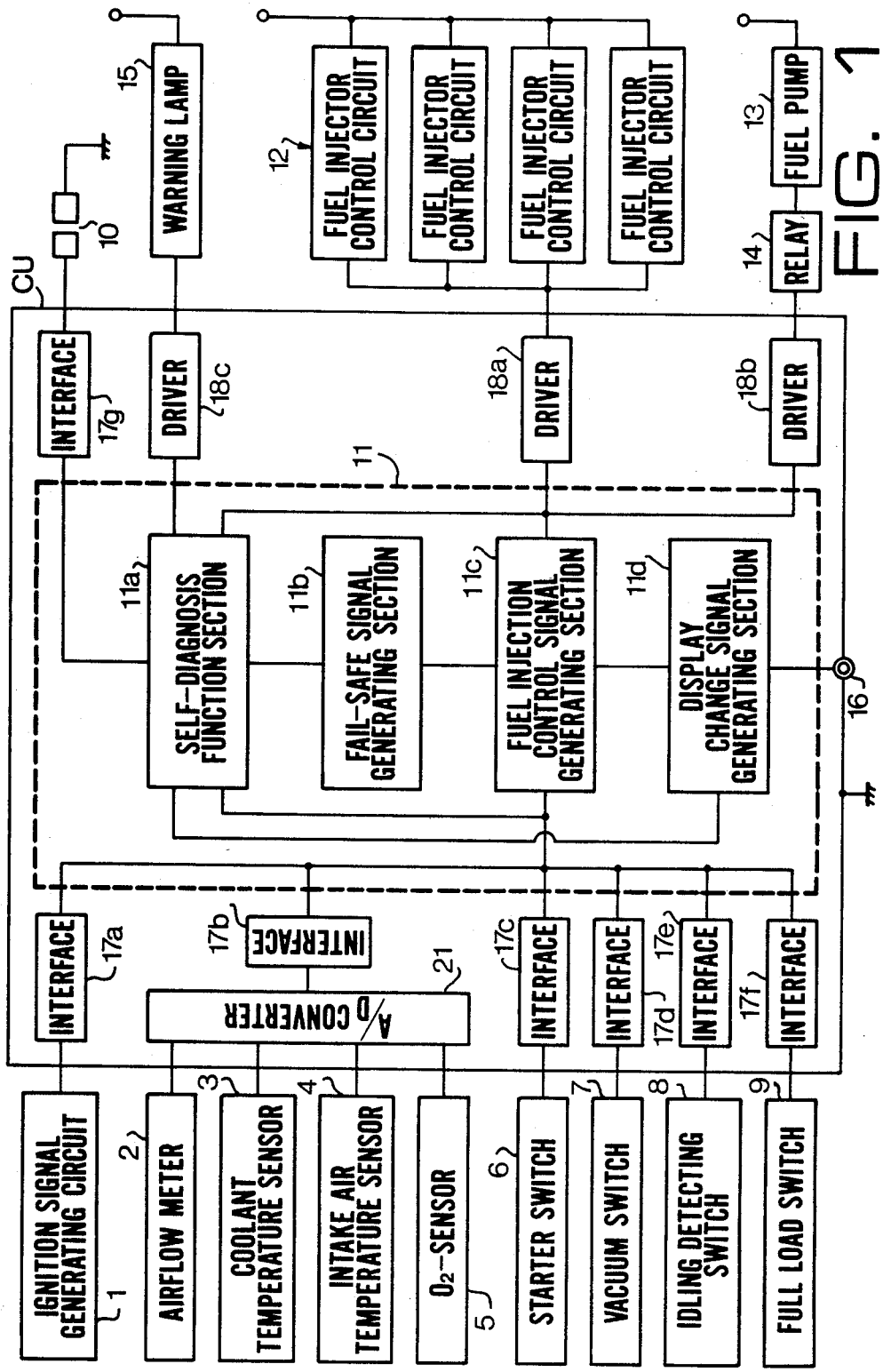
FIG. 1 is a block diagram showing a diagnosis system
for operation of an engine.

FIG. 1 diagrammatically shows a diagnosis system
for operation of an engine including a system of the
present invention. The system comprises an engine operation detecting means group 1 to 9, and a control unit
CU. The control unit CU comprises interface group 17a
to 17g, drivers 18a to 18c, and a computor 11 including
section group 11a to 11d. The detecting means group
comprises an ignition signal generating circuit 1, the
output signal of which represents an ignited cylinder of
the engine and the ignition timing thereof, an air-flow
meter 2, a coolant temperature sensor 3, an intake air
temperature sensor 20 4, and an $O_2$-sensor 5 for detecting oxygen concentration in exhaust gases. The detecting means group further comprises a starter switch 6 for
detecting operation of the starter of the engine, a vacuum switch 7 for detecting the vacuum in the intake
passage of the engine, an idling detecting switch 8
which is operated by a throttle valve shaft at the idling
position of the throttle valve, and a full load switch 9
which is also operated by the throttle valve shaft at a
wide open throttle position of the throttle valve. The
computer 11 comprises a self-diagnosis function section
11a, a fail-safe signal generating section 11b, a fuel injection control signal generating section 11c and a display
change signal generating section 11d. During driving of
the motor vehicle, a terminal 10 is disconnected to the
ground. The output of the ignition signal generating
circuit 1 is applied to self-diagnosis function section 11a
and fuel injection control signal generating section 11c
through the interface 17a. Outputs of the air-flow meter
2 and sensors 3 to 5 are applied to sections 11a and 11c
through an A/D converter 21 and the interface 17b.
Further, outputs of switches 6 to 9 are applied to sections 11a and 11c through interfaces 17c to 17f, respectively.

The self-diagnosis function section 11a monitors inputs from the engine operation detecting means group 1
to 9 and when any fault is detected, a signal is sent to a
warning lamp 15 through the driver 18c to warn the
fault. Further, when such serious engine trouble that
will stall the engine occurs, the self-diagnosis function
section 11a sends a diagnosis signal dependent on the
kind of the engine trouble to the fail-safe signal generating section 11b. The fail-safe signal generating section
11b stores data to avoid the engine stalling caused by
the engine trouble and produces a fail-safe signal dependent on the diagnosis signal. The fail-safe signal is fed to
the fuel injection control signal generating section 11c
which operates to stop the input from the detecting
means group 1 to 9. In normal engine operation, the fuel
injection control signal generating section 11c operates
to produce an air-fuel ratio control signal by computing
inputs applied from the engine operation detecting
means group 1 to 9. The air-fuel ratio control signal is
fed to a fuel pump 13 through the driver 18b and a relay
14 and to fuel injector control circuits 12 through the
driver 18a so as to inject a proper amount of fuel at a
proper time. Further, the fuel infection control signal
generating section 11c sends a signal to the display
change signal generating section 11d in response to an
input from the $O_2$-sensor 5. The display change signal
generating section 11d sends a signal to a monitor lamp
16 in response to the signal from the fuel injection control signal to indicate that the exhaust gases have a normal oxygen concentration.

When the fail-safe signal is fed from the fail-safe signal generating section. 11b to the fuel injection control signal generating section 11c, the section 11c produces a quasi air-fuel ratio control signal dependent on the fail-safe signal. The quasi air-fuel ratio control signal is sent to fuel injector control circuits 12, so that the engine continues to operate in accordance with the quasi signal without stalling.

Further, if the terminal 10 is connected to the ground at a shop, the display change signal generating section 11d sends a signal to the lamp 16 in dependency on the diagnosis signal fed from the self-diagnosis function section 11a. The lamp 16 intermittently lights in accordance with a pattern which is decided by the diagnosis signal. An inspection at the shop can recognize the kind of the engine trouble by the pattern of the lighting of the lamp 16.

Figure 2:
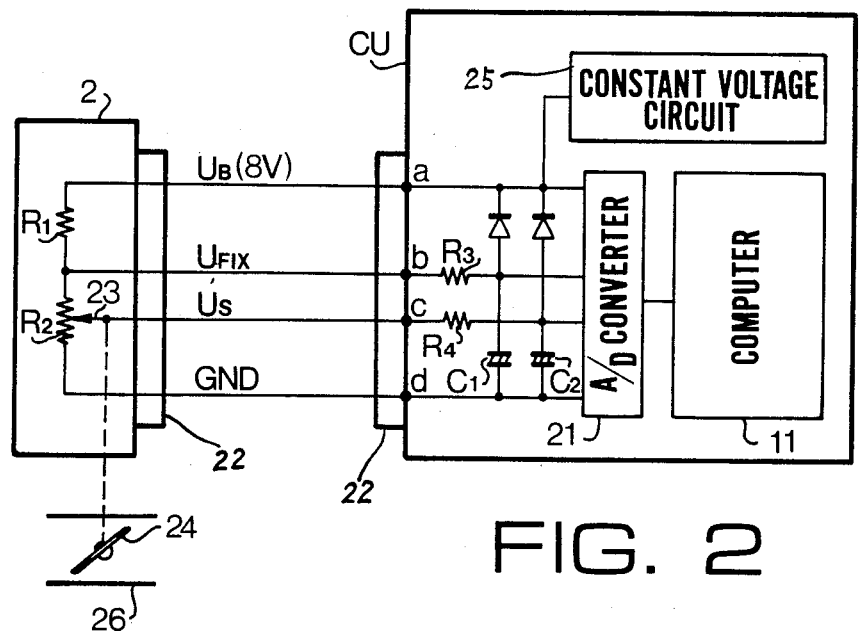
FIG. 2 is an airflow meter diagnosing circuit according to the present invention.

FIG. 2 shows an air-flow meter diagnosing circuit according to the present invention. The air-flow meter 2 comprises a potentiometer as a voltage divider comprising resistors R1, R2, a wiper 23 slidably engaging the resistor R2, and a flap 24 provided in an intake passage 26 to the engine and operatively connected to the wiper 23. The air-flow meter 2 is connected to the control unit CU by a connecter 22 and leads. One end of the resistor R1 is connected to the A/D converter 21 through a terminal a and applied with a constant-voltage UB (for example 8 volts) from a constant voltage circuit 25. An intermediate point between resistors R1 and R2 is connected to the A/D converter through a terminal b and a resistor R3, so that a reference fixed voltage $U_{FIX}$ is applied to the A/D converter. A voltage at the wiper 23, that is the output voltage US varying with the movement of the flap 24 of the air-flow meter 2 is applied to the A/D converter through a terminal c and a resistor R4.

Further, the ground voltage GND is applied through a terminal d. Smoothing capacitors C1 and C2 are connected between ends of resistors R3 and R4 and the ground, respectively. The computer 11 is applied with signals corresponding to the voltages US and $U_{FIX}$ to compute the amount of intake air. The amount of the intake air Q can be obtained by the following formula:

$$Q = A(U_{FIX} - US)/UB$$

where A is a constant.

In accordance with the present invention, the self-diagnosis function section 11a (FIG. 1) of the computor 11 monitors the level of the voltage US and produces a diagnosis signal for fail-safe operation, when the level of the voltage US decreases to a predetermined low level.

Figure 3:
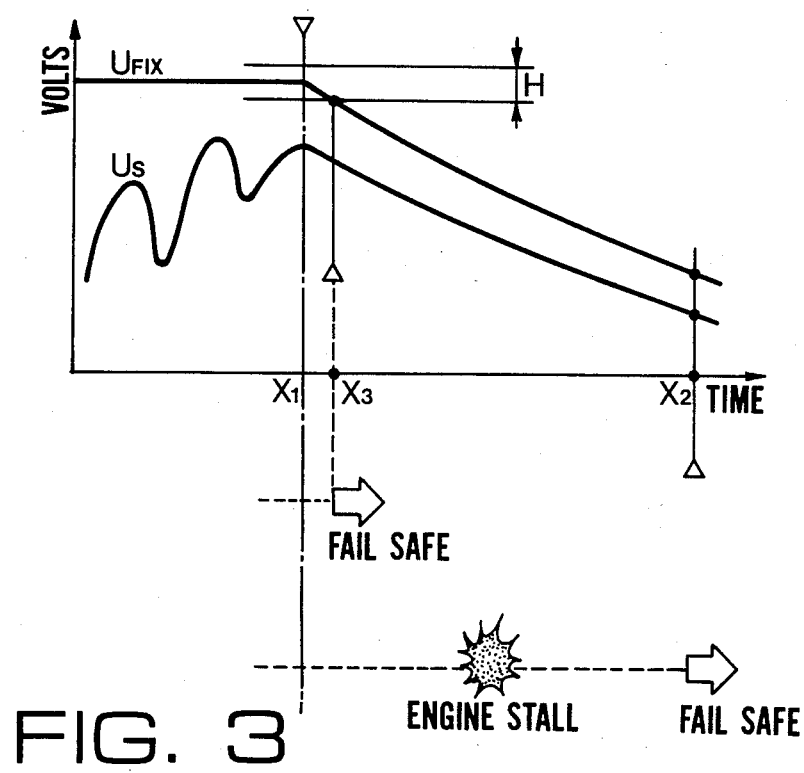
FIG. 3 is a graph showing fail-safe generating times
according to the system of the present invention and to
a conventional system.

Referring to FIG. 3, assuming that the connector 22 disengages by accident at a time X1, capacitors C1 and C2 gradually discharge, so that the voltages $U_{FIX}$ and US decrease as illustrated. A conventional diagnosis system monitors the level of the voltage US to produce a fail-safe signal. Since the voltage US fluctuates at considerably large amplitudes during a normal operating condition of the engines, the conventional diagnosis system generates a fail-safe signal at a time X2 when the voltage US decreases to a very low level in order to avoid misjudgement. Therefore, a long time elapses before the fail-safe signal is generated, resulting in stalling of the engine before fail-safe operation starts.

In the system of the present invention, since the level of the fixed voltage $U_{FIX}$ is monitored, a slight deflection of the fixed voltage may be regarded as a signal representing trouble. Accordingly, the fail-safe signal may be generated at time X3 when the level exceeds a relatively narrow range H. Accordingly, the fail-safe signal can be produced early so as to avoid engine stalling.

Figure 4:
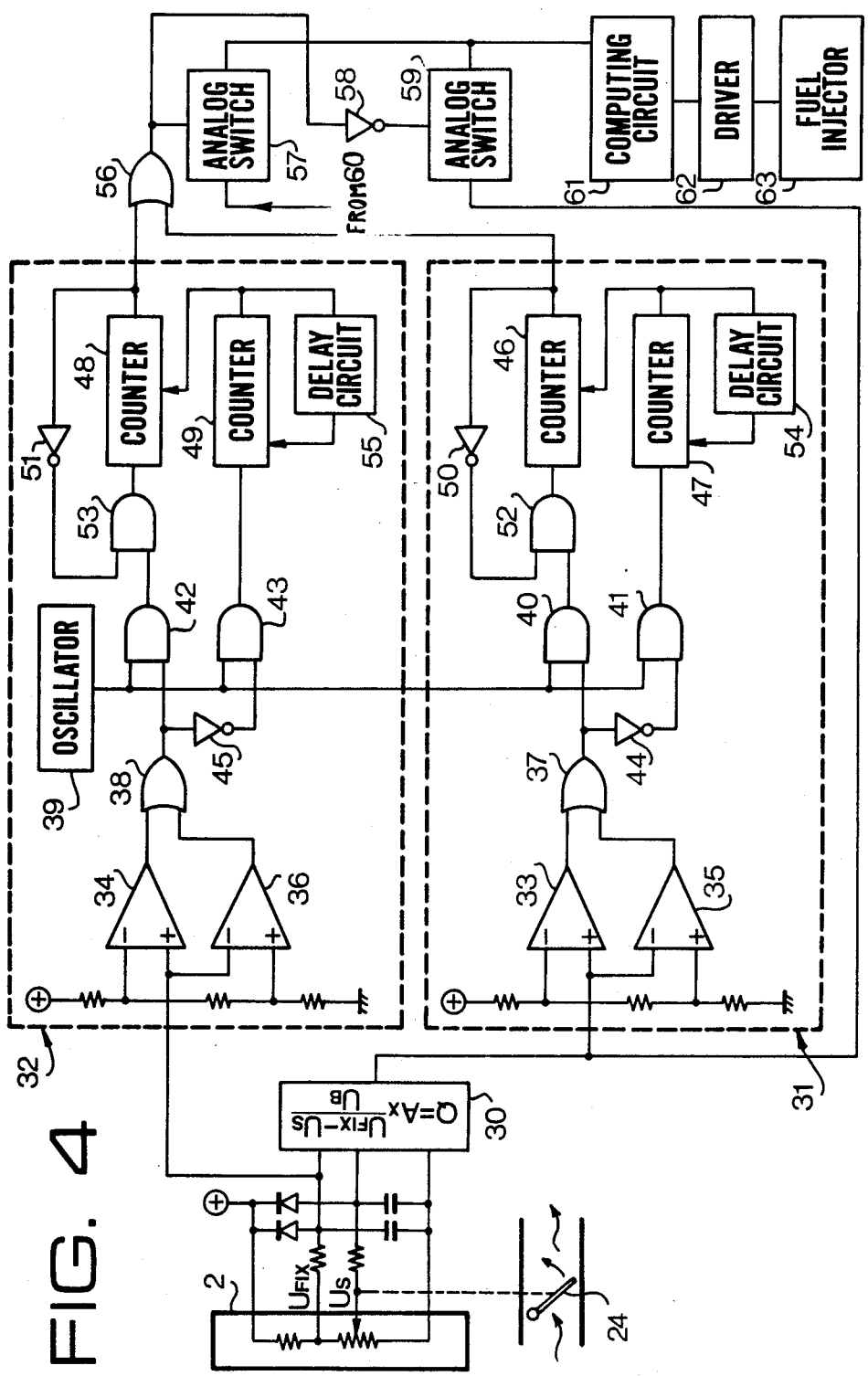
FIG. 4 is a block diagram showing a diagnosis system
according to the present invention.

FIG. 4 shows an example of a self-diagnosis function system. The system comprises a computing circuit 30 for computing the amount of intake air Q, first and second diagnosing circuits 31 and 32. The voltage $U_{FIX}$ is applied to a window comparator comprising OP amps 34 and 36 and an OR gate 38 in the second diagnosing circuit 32. The output of the computing circuit 30 is applied to a window comparator comprising OP amps 33 and 35 and an OR gate 37 in the first diagnosing circuit 31 and further applied to a computing circuit 61 through an analog switch 59. The output of the window comparator of the first diagnosing circuit 31 is applied to an AND gate 40 and also applied to an AND gate 41 through an inverter 44. Similarly, the output of the window comparator of the second diagnosing circuit 32 is applied to an AND gate 42 and to an AND gate 43 through an inverter 45. AND gates 40 to 43 are applied with pulses from an oscillator 39 to produce pulses dependent on the outputs of the two window comparators.

The first and second diagnosing circuits 31 and 32 are provided with first counters 46 and 48 for detecting the fault of the air-flow meter system and second counters 47 and 49 for resetting the first counters 46 and 48.

If the voltage $U_{FIX}$ exceeds the predetermined range H (FIG. 3) of the window comparator because of fault in the air-flow meter, the output of the OR gate 38 becomes high, so that the AND gate 42 produces pulses. The pulses are applied to the counter 48 through an AND gate 53. When the count of the counter 48 exceeds a set count corresponding to the predetermined range H, the counter 48 produces a high level output. The output is applied to the other input of the AND gate 53 through an inverter 51, so that the AND gate 53 is closed to hold the output of the counter 48. The output of the counter 48 is applied through an OR gate 56 to a control gate of an analog switch 57 to close it and also applied to the control gate of the analog switch 59 through an inverter 58 to open the switch. Therefore an output of a fail-safe circuit 60 is applied to the computing circuit 61. It is necessary to reset the counter 48, if the trouble in the air-flow meter system recovers after a short time. The counter 49 is to reset the counter 48. The output of the OR gate 38 is at a low level in normal operating conditions, so that the AND gate 43 is opened to produce pulses. When the number of pulses applied to the counter 49 reaches a predetermined value which corresponds to the above described short time the counter 49 produces an output. The output is applied to a reset terminal of the counter 48 to reset it and also applied to its own reset terminal through a delay circuit 55. Thus, the reset operation of the counters 48 and 49 is repeated as long as air-flow meter system is in normal condition. Similarly, the first diagnosing circuit 31 is provided with an inverter 50, AND gate 52 and delay circuit 54 and operates in the same manner as the second diagnosing circuit 32 in response to the output of the computing circuit 30. When a fault occurs in the air-flow meter system and the analog switch 57 is closed by the output of the OR gate 56, a fail-safe signal from a fail-safe circuit 60 (FIG. 5) corresponding to the fail-safe signal generating circuit 11b of FIG. 1 is fed to the computing circuit 61 through the switch 57. The computing circuit 61 produces a quasi air-fuel ratio control signal in response to the fail-safe signal and with reference to data stored therein. The quasi air-fuel ratio control signal is fed to a fuel injector 63 through a driver 62 to inject the fuel at a proper air-fuel ratio so as to keep the engine operation.

Figure 5:
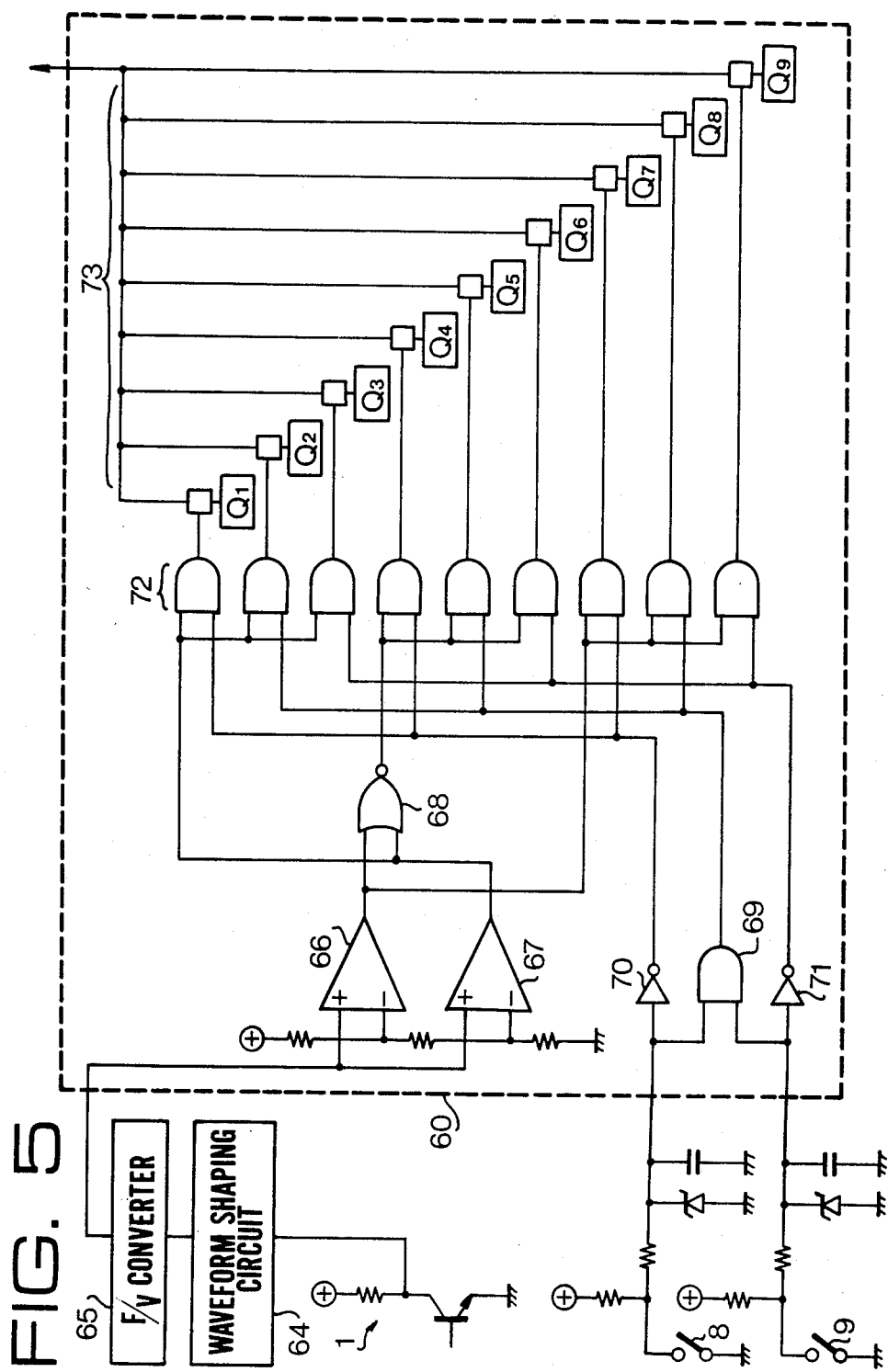
FIG. 5 is a circuit for generating fail-safe signals.

Referring to FIG. 5 showing the fail-safe circuit 60, the circuit is adapted to produce nine kinds of fail-safe signals in dependency on engine speed and throttle position. An engine speed signal is produced by a waveform shaping circuit 64 for shaping ignition pulses from the ignition signal generating circuit 1 and by a frequency-to-voltage (F/V) converter 65 and is applied to a window comparator comprising OP amps 66 and 67 and an OR gate 68. Throttle position signals are obtained by the idling detecting switch 8 and the full load switch 9 and are applied to inverters 70 and 71 and an AND gate 69, respectively. Outputs of OP amps 66, 67, OR gate 68, inverters 70, 71 and AND gate 69 are combined and applied to nine AND gates 72 to produce one of nine outputs in dependency on engine operating conditions. Outputs of the AND gates 72 are connected to control gates of analog switches 73, respectively. The analog switches 73 pass fail-safe signals Q1 to Q9 in dependency on the outputs of the AND gates 72, respectively. Thus, one of the fail-safe signals is fed to the computing circuit 61 in accordance with engine operating conditions.

From the foregoing it will be understood that, in accordance with the preset invention, a reference fixed voltage is monitored and when the voltage exceeds a predetermined range, a fail safe signal is generated. Accordingly, fail-safe operations can be quickly effected so as to avoid stalling of an engine.

While the presently preferred embodiment of the present invention has been shown and described, it is to be understood that this disclosure is for the purpose of illustration and that various charges and modifications may be made without departing from the spirit and scope of the invention as set forth in the appended claims.

What is claimed is:

1. A system for diagnosing an internal combustion engine comprising
   an air-flow meter including a variable resistor responsive to volume of intake air of the engine for producing an output voltage and having a movable contact, one end of the variable resistor being connected to a fixed voltage terminal normally having a fixed voltage, the other end of the variable resistor being connected to a ground terminal, and the movable contact of the variable resistor being connected to a variable voltage terminal, voltage between the movable terminal and the ground terminal being responsive to the volume of the intake air of the engine for producting said output voltage,
   a first smoothing capacitor connected between the variable voltage terminal and the ground terminal for charging thereon said output voltage of the air-flow meter,
   a second smoothing capacitor connected between said fixed voltage terminal and the ground terminal for charging thereon said fixed voltage,
   means comprising a diagnosing circuit for detecting a fault of the air-flow meter for producing a diagnosis signal when said fixed voltage varies beyond a predetermined range which is smaller than the range of fluctuation of the output voltage at the movable contact, so as to diagnose a fault of the air-flow meter.

2. The system according to claim 1, further comprising
   computer means for computing the volume of the intake air from said output voltage and said fixed voltage at said fixed voltage terminal and connected to said diagnosing circuit.

3. The system according to claim 1, wherein said air-flow meter further comprises
   a voltage divider comprising another resistor and said variable resistor, and
   a flap provided in an intake passage of said engine and operatively connected to said movable contact.

4. The system according to claim 3, further comprising
   a constant voltage circuit,
   said another resistor is connected between said constant voltage circuit and said one end of said variable resistor,
   diodes respectively connected between each said capacitors and said constant voltage circuit.

5. The system according to claim 1, wherein said diagnosing circuit comprising,
   comparator means for detecting the fault of said air-flow meter by operatively comparing the level of said fixed voltage with a predetermined reference.

6. The system according to claim 5, wherein said comparator means comprises a window comparator comprising two comparators and an OR gate connected between outputs of said two comparators and said other input of said first AND gate and said other input of said third AND gate via said second inverter.

7. The system according to claim 5, wherein said diagnosing circuit further comprising,
   a counter- and logic circuit operatively connected to said comparator means comprising a first AND gate, a second AND gate and a first counter connected in series, an output of said counter being fed back via a first inverter to another input of said second AND gate, and an oscillator connected to an input of said first AND gate, the other input of said first AND gate is operatively connected to said comparator means.

8. The system according to claim 7, wherein said counter- and logic circuit further comprises
   a third AND gate and a second counter connected to an output of said third AND gate, said second counter having an output connected to reset inputs of said first and second counters, one input of said third AND gate is connected to said oscillator, and a second inverter is operatively connected between said comparator means and said other input of said third AND gate.

9. The system according to claim 8, wherein said counter- and logic circuit further comprises
   a delay circuit connected between said output and reset input of said second counter.

10. The system according to claim 1, further comprising
    a fail-safe circuit means for generating a respective fail-safe signal dependent on specific detected conditions of operation of the engine, and
    gate means responsive to said diagnosing signal for passing said respective fail-safe signal therethrough.

* * * * *